Oct. 13, 1970  F. SIROLA  3,533,317
TOOL HOLDER WITH MEANS FOR RETAINING A TOOL THEREIN
Filed Sept. 10, 1968  2 Sheets-Sheet 1
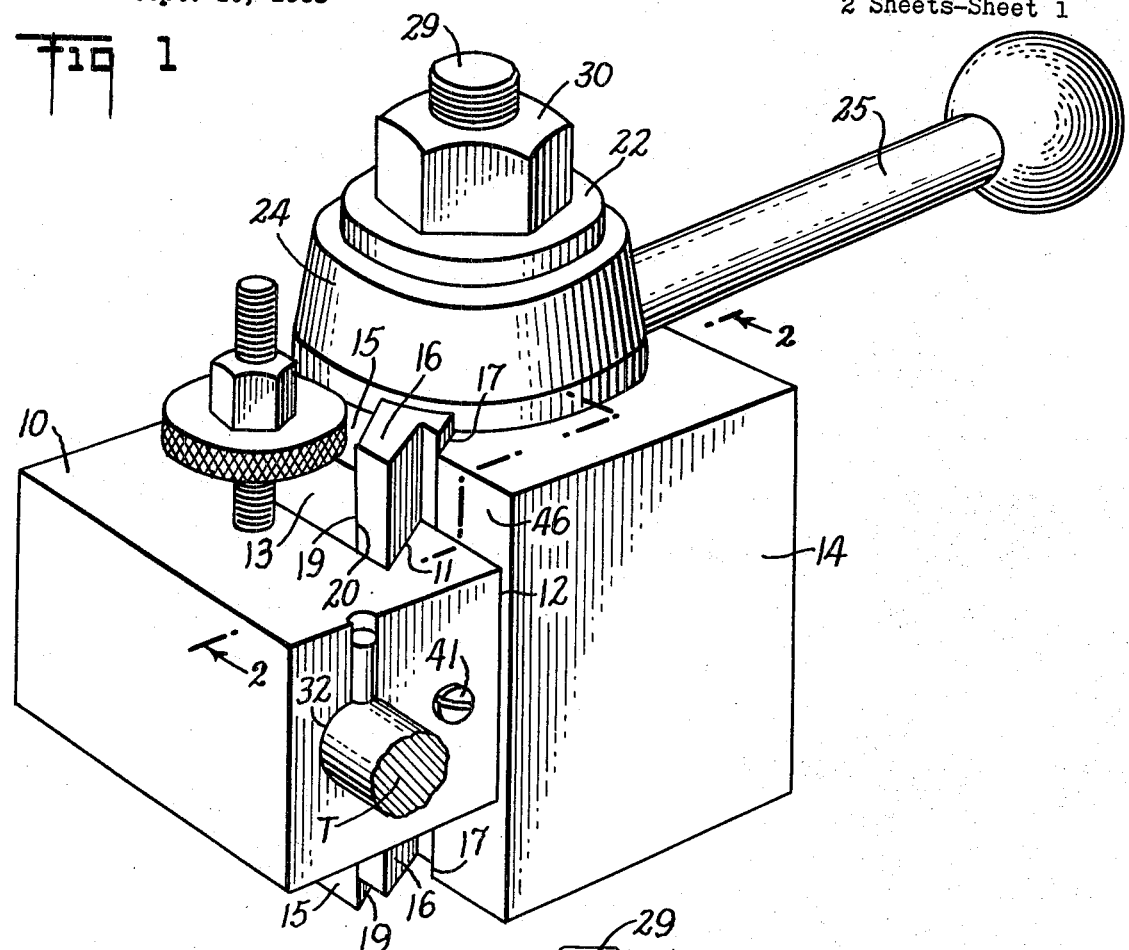
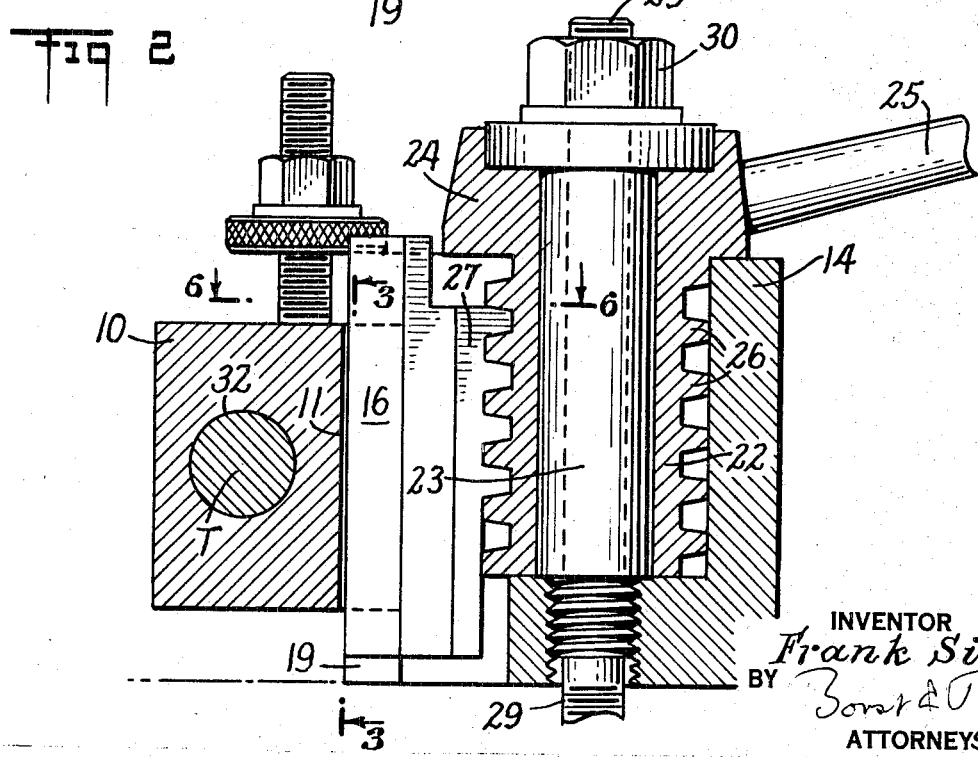
INVENTOR
*Frank Sirola*
BY
*Borst & Borst*
ATTORNEYS

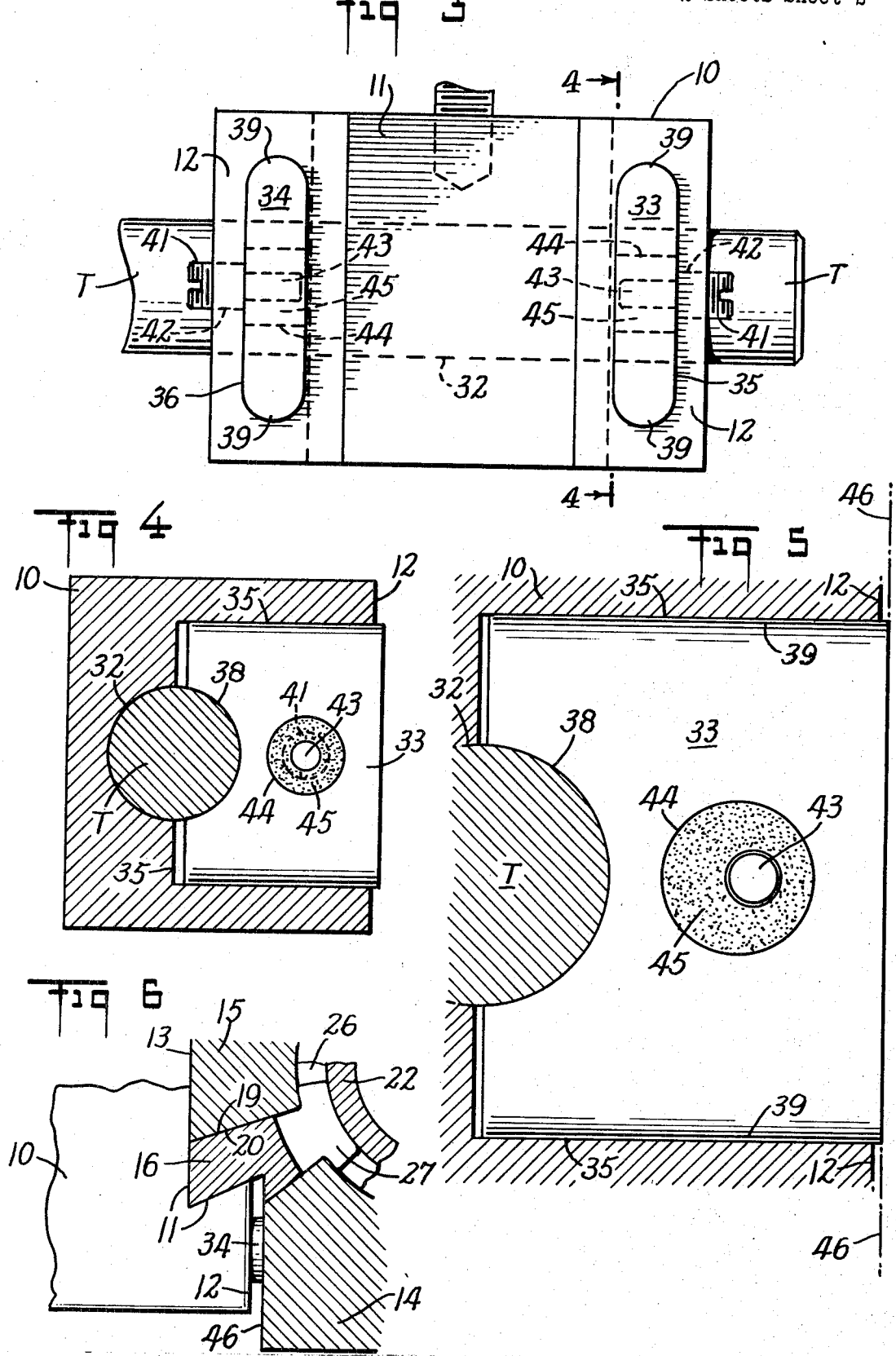

United States Patent Office 3,533,317
Patented Oct. 13, 1970

3,533,317
TOOL HOLDER WITH MEANS FOR RETAINING A TOOL THEREIN
Frank Sirola, 419 Getty Ave., Clifton, N.J. 07011
Filed Sept. 10, 1968, Ser. No. 758,914
Int. Cl. B23b 29/00
U.S. Cl. 82—36                                  4 Claims

ABSTRACT OF THE DISCLOSURE

The disclosure comprehends a holder for a drill, boring bar and the like which is provided with automatic means for securing a tool of said character in the holder with the securement of the holder on a tool post of a lathe. The aforesaid means includes slide members arranged in openings in the holder and protruding through one face thereof for engagement against one face of the tool post when secured thereon. The holder is formed with a bore adapted to receive the tool and the slide members are moved inwardly from said protruding relation against the tool in the bore for securing the same in said bore with the securement of the holder in the tool post. The slide members have limited movement in said openings in the holder and are maintained in said protruding relation by resilient elements.

---

This invention relates to a holder for a drill, boring bar and the like and has particular reference to a holder having automatic means for securing the drill, boring bar and the like in the holder.

The holder is of a character adapted to be mounted in a tool post of a lathe which is arranged to tighten the holder against a side face thereof to secure the holder on the post.

An object of the invention is to provide the holder with means adapted to automatically engage against the tool post and hold the drill, boring bar and the like in the holder with the securement of the holder on the tool post.

Another object of the invention is to provide a holder of said character having a bore for receiving a drill, boring bar and the like and with slide members mounted in said holder and resiliently tensioned to retain the same in slight normally protruding relations through one face thereof and which slide members are moved inwardly into impinging relation with the drill, boring bar and the like against said tension with the securement of the holder on the tool post.

With the foregoing and other objects in view, reference is now made to the following specification and accompanying drawings in which a preferred embodiment of the invention is illustrated.

In the drawings:

FIG. 1 is a perspective view of a tool holder constructed in accordance with the invention; and shown in position on a tool post of a lathe;

FIG. 2 is a vertical sectional view taken on line 2—2 of FIG. 1;

FIG. 3 is a fragmentary vertical sectional view of a tool holder removed from the post on line 3—3 of FIG. 2;

FIG. 4 is a vertical sectional view taken on line 4—4 of FIG. 3;

FIG. 5 is an enlarged sectional view showing one of the slide members in impinging relation against the shank of a tool arranged in the holder and with the tensioning means under tension; and FIG. 6 is a fragmentary cross-sectional view on line 6—6 of FIG. 2.

Referring to the drawings, the tool holder 10 is formed with a dovetail recess 11 in the longitudinally extending face 12 thereof which is adapted to slidably receive a dovetail tongue 13 provided on a tool post of a lathe.

The tool post may be of the construction disclosed in Letters Patent No. 2,972,272 issued to me Feb. 21, 1961 in which the dovetail tongue 13 consists of a fixed portion 15 and a wedge section 16 which is slidable in a slot 17 in the body 14 of the tool post to dispose a side face 19 of the fixed portion 15 in engagement with a side face 20 of the wedge section 16. The side faces 19 and 20 are cooperatively inclined so as to cam the wedge section 16 laterally when the same is moved downwardly in the slot 17 relative to the fixed position 15 of said dovetail tongue 13. This movement of said wedge section tightens the dovetail tongue 13 in the dovetail recess 11 so as to retain the holder 10 on the tool post.

The tool post also includes a hub 22 which is swivelly mounted on a sleeve 23 and has a head 24 which seats on the top of the body 14 of the tool post with the hub 22 arranged therein. The head 24 is provided with a handle member 25 and the hub 22 is helically threaded as at 26 below the head 24 and to the lower end thereof which is engaged by a helically threaded arcuate inner portion 27 formed on the wedge section 16. It will be understood that turning the handle member 25 in one direction functions to move the wedge section 16 downwardly for securing the holder on the dovetail tongue 13 and turning the handle member 25 in the opposite direction functions to turn the head 24 and the hub 22 so as to move the said wedge section for releasing the holder. The sleeve 23 is mounted on a stem 29 adapted to be arranged on a slide of a lathe. The stem 29 forms the center post for the hub 22 and sleeve 23 which are retained therein by a nut 30 threaded on the upper end of the stem and tightened against the head of the sleeve 23.

The holder 10 is formed with a longitudinally extending bore 32 adapted to snugly receive the shank of a drill boring bar and the like such as the tool T fragmentarily shown in the drawings. In order to secure the same in said bore, the holder is provided with slide members 33 and 34 which are slidably arranged in transversely extending slots 35 and 36 adjacent the ends thereof. The said slots open into the bore 32 and through the longitudinal face 12 of the holder. The slide members 33 and 34 have arcuate recesses 38 in their inner end portions which conform to slightly less than half of the peripheral curvature of the shank of the tool T. The said members also have upper and lower semicylindrical curved end portions 39 which snugly fit correspondingly curved end portions of the slots to provide arcuate sliding movement thereof. The said members are of a length to protrude slightly through the face 12 of the holder when the inner ends thereof are in engagement with the shank of the tool T as shown in FIGS. 4 and 5 of the drawings.

The slide members 33 and 34 are retained in the slots 35 and 36 respectively by means of set screws 41 which engage threaded bores 42 in the holder and have reduced inner ends 43 extending through openings 44 in said slide members. Resilient apertured discs 45 are arranged on the inner ends 43 and snugly fit the openings 44 to thereby retain the slide members in untensioned position in the slots as shown in FIG. 4 of the drawings and when the holder is secured in the tool post against the side face 46 of the body 14 thereof the slide members are forced inwardly into impinging relation against the shank of the tool T thus securely retaining the tool in position in the holder. This movement of the slide members functions to tension the discs 45 so that the same move the slide members outwardly when the holder is freed from the tool post so that the tool can be readily withdrawn from the holder.

A tool holder is thus provided which automatically secures the tool in position therein with the securement of the holder on the tool post.

While the preferred form of the invention has been shown and described herein, it is to be understood that the invention is not so limited but shall cover and include all modifications thereof which fall within the perview of the invention.

What is claimed is:

1. A tool holder of the character adapted to be mounted on a tool post of a lathe and having with said tool post interengaging dovetail tongue and recess for securing the holder against a side face of the tool post, said holder having a longitudinally extending bore adapted to receive the shank of a tool and having spaced transversely extending slots opening into said bore and through a side face of said holder, slide members mounted in said solts and having arcuately shaped recesses in their inner ends adpated to engage the shank of said tool, and resilient means engaging said slide members retaining the same in normally protruding relation through said side face of the holder, and said slide members engaging against said tool post and being moved inwardly against said tension and into engagement with the said shank of the tool for securing the tool in the said bore of the holder with the securement of the holder on the tool post.

2. A tool holder as set forth in claim 1, in which said slots open through the side face of said holder adjacent the ends of said dovetail recess therein, and said holder and slide members have interengaging means retaining said slide members in said slots and permitting limited sliding movement therein.

3. A tool holder as set forth in claim 2, in which said interengaging means have said resilient means which retain said slide members in said normally protruding relation.

4. A tool holder of the character adapted to be mounted in a tool post of a lathe and having a bore adapted to receive a tool therein, said holder having slots opening into said bore and through a side face of said holder, slide members arranged in said slots and having arcuately shaped recesses in their inner ends adapted to fit a peripheral portion of the tool in said bore, said slide members being of a length to protrude slightly through said side face of the holder when the inner ends thereof are in engagement with said tool, and said slide members being forced inwardly in tight impinging relation against said tool to retain the same in position with the securement of the holder against a side face of the tool post.

References Cited

UNITED STATES PATENTS 2,136,091 11/1938 Tiefenbacher _____ 82—37
2,333,228 11/1943 Barrett _____ 82—37

LEONIDAS VLACHOS, Primary Examiner